US011161923B2

(12) United States Patent
Liu et al.

(10) Patent No.: US 11,161,923 B2
(45) Date of Patent: Nov. 2, 2021

(54) SELECTIVELY TRANSITIONING POLYMERIZATION PROCESSES

(71) Applicant: Univation Technologies, LLC, Houston, TX (US)

(72) Inventors: Bo Liu, Lake Jackson, TX (US); Mark G. Goode, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 16/651,363

(22) PCT Filed: Oct. 9, 2018

(86) PCT No.: PCT/US2018/054906
§ 371 (c)(1),
(2) Date: Mar. 27, 2020

(87) PCT Pub. No.: WO2019/083715
PCT Pub. Date: May 2, 2019

(65) Prior Publication Data
US 2020/0262950 A1    Aug. 20, 2020

Related U.S. Application Data

(60) Provisional application No. 62/578,058, filed on Oct. 27, 2017.

(51) Int. Cl.
*C08F 210/02*     (2006.01)
*C08F 2/01*       (2006.01)
*C08F 2/34*       (2006.01)
*C08F 4/69*       (2006.01)

(52) U.S. Cl.
CPC .............. *C08F 210/02* (2013.01); *C08F 2/01* (2013.01); *C08F 2/34* (2013.01); *C08F 4/69* (2013.01)

(58) Field of Classification Search
CPC ............. C08F 210/02; C08F 2/34; C08F 4/69
USPC ...................................................... 526/335
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye |
| 3,324,101 A | 6/1967 | Baker et al. |
| 3,622,251 A | 11/1971 | Allen |
| 3,704,287 A | 11/1972 | Johnson |
| 3,709,853 A | 1/1973 | Karapinka |
| 4,003,712 A | 1/1977 | Miller |
| 4,011,382 A | 3/1977 | Levine et al. |
| 4,100,105 A | 7/1978 | Levine et al. |
| 4,302,566 A | 11/1981 | Karol et al. |
| 4,453,399 A | 6/1984 | Thompson |
| 4,482,687 A | 11/1984 | Noshay et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,008,204 A | 4/1991 | Stehling |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,022,933 A | 2/2000 | Wright et al. |
| 6,489,408 B2 | 12/2002 | Mawson et al. |
| 6,723,805 B2 | 4/2004 | Braganca et al. |
| 6,989,344 B2 | 1/2006 | Cann et al. |
| 7,078,467 B1 | 7/2006 | Kolb et al. |
| 7,238,765 B2 | 7/2007 | Lee et al. |
| 7,504,467 B2 | 3/2009 | Ochs |
| 7,511,109 B2 | 3/2009 | Arnoux et al. |
| 7,714,072 B2 | 5/2010 | Michie, Jr. et al. |
| 7,897,710 B2 | 3/2011 | Amos et al. |
| 8,101,691 B2 † | 1/2012 | Goode |
| 8,227,552 B2 | 7/2012 | Kolb et al. |
| 8,497,329 B2 | 7/2013 | Kolb et al. |
| 8,637,615 B2 | 1/2014 | Li et al. |
| 8,706,665 B2 | 4/2014 | Andre |
| 9,243,091 B2 | 1/2016 | Moineau et al. |
| 9,550,847 B2 | 1/2017 | Bell et al. |
| 2002/0150648 A1 | 10/2002 | Cree |
| 2006/0155081 A1 | 7/2006 | Jorgensen et al. |
| 2006/0173123 A1 | 8/2006 | Yang et al. |
| 2008/0097054 A1* | 4/2008 | Amos ................... C08F 210/16 526/135 |
| 2011/0109388 A1 | 5/2011 | Touzard et al. |
| 2011/0313116 A1 † | 12/2011 | Knoeppel |
| 2013/0123440 A1 | 5/2013 | Samples et al. |
| 2013/0216835 A1 | 8/2013 | Moineau et al. |

(Continued)

FOREIGN PATENT DOCUMENTS

| | | |
|---|---|---|
| BE | 839380 | 9/1976 |
| EP | 0562204 A1 † | 9/1993 |

(Continued)

OTHER PUBLICATIONS

Leal, Macromolecular Materials and Engineering, Jun. 16, 2009, pp. 670-676, vol. 291, Issue 6.

(Continued)

*Primary Examiner* — William K Cheung

(57) ABSTRACT

A method of selectively transitioning a polymerization process making an ethylene/alpha-olefin copolymer in such a way that melt elasticity of the copolymer is substantially changed without changing comonomer and without substantially changing density of the copolymer. A method of compensating a reactor temperature-induced change in melt elasticity with an inverse change in H2/C2 gas molar ratio. Also, use of process control variable(s) to selectively change the melt elasticity.

7 Claims, No Drawings

(56) References Cited

U.S. PATENT DOCUMENTS

| | | |
|---|---|---|
| 2014/0030460 A1 | 1/2014 | Monoi et al. |
| 2016/0297907 A1 | 10/2016 | Goode et al. |
| 2017/0190816 A1 | 7/2017 | Al-Enazi |
| 2017/0274356 A1 | 9/2017 | Cann et al. |

FOREIGN PATENT DOCUMENTS

| | | |
|---|---|---|
| EP | 0649992 | 7/1997 |
| EP | 0794200 | 9/1997 |
| EP | 634421 | 10/1997 |
| EP | 0802202 | 10/1997 |
| EP | 1778769 | 5/2007 |
| EP | 2174961 | 4/2010 |
| EP | 2692746 | 11/2016 |
| WO | 1993003093 | 2/1993 |
| WO | 2004101674 | 11/2004 |
| WO | 2006007046 | 1/2006 |
| WO | 2006049857 | 5/2006 |
| WO | 2006138007 | 12/2006 |
| WO | 2009059969 | 5/2009 |
| WO | 2011075258 | 6/2011 |
| WO | 2015076928 | 5/2015 |
| WO | 2017132092 | 8/2017 |

OTHER PUBLICATIONS

Mendelson, Journal of Applied Polymer Science, Apr. 1975, pp. 1061-1078, vol. 19, Issue 4.

Wild, Determination of Branching Distributions in Polyethylene and Ethylene Copolymers, 1982, p. 441, vol. 20.

\* cited by examiner
† cited by third party

SELECTIVELY TRANSITIONING POLYMERIZATION PROCESSES

This application is a National Stage application filed under 35 USC § 371 of International Number PCT/US2018/054906, filed on Oct. 9, 2018, which claims the benefit of U.S. Provisional Application No. 62/578,058 filed Oct. 27, 2017; the entireties of which are all incorporated herein by reference.

FIELD

Transitioning a polymerization process and use of a process control variable therefor.

INTRODUCTION

WO 2006/007046 A2 to John F. Szul, et al., relates to methods for producing polymers with control over composition distribution. WO 2006/138007 A1 to Rainer Kolb, et al., relates to single catalyst low, medium and high density polyethylenes. U.S. Pat. No. 8,227,552 B2 and U.S. Pat. No. 8,497,329 B2, both to Rainer Kolb, et al., relate to methods of controlling polymer properties. US 2016/0297907 A1 to Mark G. Goode, et al., relates to methods for controlling polymer properties. WO 2017/132092 A1 to Cliff R. Mure, et al., relates to a polyolefin film with improved toughness.

SUMMARY

We recognized a need for substantially changing melt elasticity of an ethylene/alpha-olefin copolymer being made by catalyzed polymerization of ethylene and alpha-olefin in a single gas-phase polymerization (GPP) reactor without changing the alpha-olefin (comonomer) and without substantially changing the copolymer's density ($\rho$).

A technical solution to this problem was not obvious from the prior art because we recognized that the number of process control variables that are available to a skilled artisan in continuous polymerization processes in gas-phase polymerization reactor are limited, and it could not be predicted which, if any, of the process control variables could affect melt elasticity and, of those, which could do so without substantially changing density of the ethylene/alpha-olefin copolymer and without using a different comonomer or a second reactor or without substantially changing the polymerization catalyst.

Our technical solution includes a method of selectively transitioning a polymerization process making an ethylene/alpha-olefin copolymer via changing one or more process control variable(s) in such a way that melt elasticity of the copolymer is substantially changed without changing the comonomer and without substantially changing density ($\rho$) of the copolymer and without using a second reactor or substantially changing the polymerization catalyst. Also, a method of compensating a transitioning polymerization process making an ethylene/alpha-olefin copolymer in such a way that in response to a change in reactor bed temperature a process control variable is inversely changed to offset the effect of the change in reactor bed temperature on melt elasticity of the ethylene/alpha-olefin copolymer such that the melt elasticity and $\rho$ of the ethylene/alpha-olefin copolymer are substantially unchanged and without using a different comonomer or a second reactor or without substantially changing the polymerization catalyst. Also, uses of the process control variable(s) therefor.

DETAILED DESCRIPTION

The Summary and Abstract are incorporated here by reference.

Melt elasticity of a thermoplastic polymer can be thought of as the behavior of a melt of the polymer during a shaping process such as extrusion or film formation. It is one of the determinants of viscoelastic melt behavior, wherein viscosity decreases with increasing shear rate. Unsatisfactory melt elasticity may undesirably cause die swell during extrusion or problems with bubble stability during film blowing. A measure of, or proxy for, melt elasticity used herein is a melt storage modulus (G') value that is measured using DMA (Dynamic Mechanical Analysis) on polymer melts at 190° C. perform small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G' (G"=3,000 Pa) value in pascals of melt storage modulus (G') at a dynamic frequency where loss modulus (G") is equal to 3,000 Pascals.

Some inventive embodiments are described below as numbered aspects for easy cross-referencing. Additional embodiments are described elsewhere herein.

Aspect 1. A method of transitioning a polymerization reaction making an ethylene/alpha-olefin copolymer with a same chromium-based catalyst system in a single gas-phase polymerization reactor operating at a first reactor bed temperature (RBT1), a first average polymer residence time (avgPRT1), and a first ethylene partial pressure (C2P1) and receiving an ethylene (C2) feed, a comonomer (Cx) feed, a hydrogen ($H_2$) feed, and, optionally, an oxygen ($O_2$) feed, wherein the feeds are characterized by a first H2/C2 gas molar ratio (H2/C2-1), a comonomer/ethylene gas molar ratio ("Cx/C2"), and a first O2/C2 gas volume ratio ("[O2/C2]1", vol/vol expressed in parts per million by volume (ppmv)); the method comprising: (a) making, in the reactor under first polymerization conditions comprising H2/C2-1, Cx/C2, [O2/C2]1, RBT1, and C2P1, a first ethylene/alpha-olefin copolymer having a first melt storage modulus G' (G"=3,000 Pa) value (MSM1), a first Composition Distribution Breadth Index value (CDBI1), a first density ($\rho$1), and a first flow index ("$(I_{21})1$"); followed by (b1), (b2), or (b3): (b1) raising or lowering the reactor bed temperature in the gas-phase polymerization reactor from RBT1 to a second reactor bed temperature (RBT2), which is from 1 to 10 degrees Celsius (° C.) higher or lower than RBT1; or (b2) decreasing or increasing, respectively, the H2/C2 gas molar ratio of the hydrogen and ethylene feeds from H2/C2-1 to a second H2/C2 gas molar ratio (H2/C2-2), which is from 0.01 to 0.20 lower or higher than H2/C2-1, in such a way that the comonomer/ethylene gas molar ratio value Cx/C2 is unchanged; or (b3) decreasing or increasing the flow index of the ethylene/alpha-olefin copolymer from $(I_{21})1$ to a second flow index ("$(I_{21})2$"), which is from 0.1 to 5 grams per 10 minutes (g/10 min.) lower or higher than $(I_{21})1$; wherein steps (a) and any one of (b1) to (b3) are conducted at the same comonomer/ethylene gas molar ratio value Cx/C2; thereby substantially changing the melt storage modulus G' (G"=3,000 Pa) of the ethylene/alpha-olefin copolymer without using a different alpha-olefin (comonomer) in the Cx feed (i.e., without changing the alpha-olefin of the Cx feed, i.e., without replacing the alpha-olefin of the Cx feed with a different alpha-olefin) and without substantially changing its density. As described, steps (a) to (b3) are performed without using a second reactor or substantially changing the chromium-based catalyst system. Step (a)

precedes steps (b1) to (b3). In some aspects also without substantially changing the copolymer's comonomer composition distribution (CCD). Composition Distribution Breadth Index (CDBI) may be used as a measure of CCD. In some aspects the first ethylene/alpha-olefin copolymer is characterized by a first CDBI value ("CDBI1") and the second ethylene/alpha-olefin copolymer is characterized by a second CDBI value ("CDBI2"), wherein CDBI2 is substantially the same as CDBI1. Copolymer is unblended (its MWD is unimodal) when characterized.

Aspect 2. The method of aspect 1 comprising steps (a) and (b1) and any one of limitations (i) to (iii): (i) wherein in step (b1) the reactor bed temperature RBT1 is increased or decreased to the reactor bed temperature RBT2 and wherein RBT2 is from 1 to 5° C., alternatively from 1 to 3° C., alternatively from 1° to 2° C. higher or lower, respectively than RBT1; (ii) wherein the second ethylene/alpha-olefin copolymer has a second melt storage modulus G' (G"=3,000 Pa) (MSM2) of from 500 to 5,000 Pascals (Pa), alternatively from 1,950 to 2,150 Pascals, alternatively from 2,000.0 to 2,140 Pa, alternatively from 2,010 to 2,090 Pa, alternatively from 2,099 to 2,145 Pa, wherein MSM2 is substantially different than MSM1; and (iii) both (i) and (ii).

Aspect 3. The method of aspect 1 comprising steps (a) and (b2) and any one of limitations (i) to (iii): (i) wherein in step (b2) the H2/C2 gas molar ratio of the hydrogen and ethylene feeds is decreased or increased, respectively, from H2/C2-1 to a second H2/C2 gas molar ratio (H2/C2-2) and wherein H2/C2-2 is from 0.01 to 0.20, alternatively 0.01 to 0.10, alternatively 0.01 to 0.05 lower or higher, respectively, than H2/C2-1; (ii) wherein the second ethylene/alpha-olefin copolymer has a second melt storage modulus G' (G"=3,000 Pa) (MSM2) of from 500 to 5,000 Pa, alternatively from 1,950 to 2,150 Pa, alternatively from 2000.0 to 2,140 Pa, alternatively from 2,010 to 2,090 Pa, alternatively from 2,099 to 2,145 Pa, wherein MSM2 is substantially different than MSM1; and (iii) both (i) and (ii).

Aspect 4. The method of aspect 1 comprising steps (a) and (b3) and any one of limitations (i) to (iii): (i) wherein in step (b3) the flow index $(I_{21})1$ of the first ethylene/alpha-olefin copolymer is increased or decreased to a second flow index ("$(I_{21})2$") of the second ethylene/alpha-olefin copolymer, wherein $(I_{21})1$ is from 0.1 to 5 g/10 min., alternatively from 0.1 to 1 g/10 min., alternatively 0.1 to 1 g/10 min. higher or lower, respectively, than $(I_{21})2$; (ii) wherein the second ethylene/alpha-olefin copolymer has a second melt storage modulus G' (G"=3,000 Pa) (MSM2) of from 500 to 5,000 Pa, alternatively from 1,950 to 2,150 Pa, alternatively from 2000.0 to 2,140 Pa, alternatively from 2,010 to 2,090 Pa, alternatively from 2,099 to 2,145 Pa, wherein MSM2 is substantially different than MSM1; and (iii) both (i) and (ii).

Aspect 5. A method of compensating a transitioning polymerization reaction making an ethylene/alpha-olefin copolymer with a same chromium-based catalyst system in a single gas-phase polymerization reactor operating at a first reactor bed temperature (RBT1), a first average polymer residence time (avgPRT1), and a first ethylene partial pressure (C2P1) and receiving an ethylene (C2) feed, a comonomer (Cx) feed, a hydrogen ($H_2$) feed, and, optionally, an oxygen ($O_2$) feed wherein the feeds are characterized by a first H2/C2 gas molar ratio (H2/C2-1), a comonomer/ethylene gas molar ratio ("Cx/C2"), and a first O2/C2 gas volume ratio ("[O2/C2]1", vol/vol in ppmv); the method comprising: (a) making, in the reactor under first polymerization conditions comprising H2/C2-1, Cx/C2, [O2/C2]1, RBT1, and C2P1, a first ethylene/alpha-olefin copolymer having a first melt storage modulus G' (G"=3,000 Pa) value (MSM1), a first Composition Distribution Breadth Index value (CDBI1), a first density (ρ1), and a first flow index ("$(I_{21})$1"); (b1) raising or lowering the reactor bed temperature in the gas-phase polymerization reactor from RBT1 to a second reactor bed temperature (RBT2), which is from 1° to 10° C. higher or lower than RBT1 and (c) decreasing or increasing, respectively, the H2/C2 gas molar ratio in such a way that the comonomer/ethylene gas molar ratio value Cx/C2 is unchanged, wherein steps (a) to (c) are done without changing the alpha-olefin of the Cx feed; thereby making at steady-state conditions after step (c) a second ethylene/alpha-olefin copolymer at a different reactor bed temperature (RBT2) than the first reactor bed temperature RBT1, wherein the second ethylene/alpha-olefin copolymer has the same alpha-olefin and has a second melt storage modulus G' (G"=3,000 Pa) (MSM2) and second density value (ρ2), wherein MSM2 is substantially the same as MSM1 and ρ2 is substantially the same as ρ1. In some aspects the CDBI2 of the second ethylene/alpha-olefin copolymer is substantially the same as CDBI1 of the first ethylene/alpha-olefin copolymer. As described, steps (a) to (c) are performed without using a second reactor or substantially changing the chromium-based catalyst system. Step (a) precedes steps (b1) and (c). Step (c) may be begun before step (b1), alternatively step (c) may be begun at the same time as step (b1), alternatively step (c) may be begun after step (b1). Step (c) may be completed before step (b1) is begun, alternatively step (c) may be completed during step (b1), alternatively step (b1) may be completed before step (c) is begun, alternatively step (b1) may be completed during step (c).

Aspect 6. The method of aspect 5 having any one of limitations (i) to (v): (i) wherein in step (b1) the reactor bed temperature RBT1 is increased to the reactor bed temperature RBT2 and wherein RBT2 is from 1° to 5° C., alternatively from 1° to 3° C., alternatively from 1° to 2° C. higher than RBT1; and wherein in step (c) the H2/C2 gas molar ratio of the hydrogen and ethylene feeds is decreased from H2/C2-1 to a second H2/C2 gas molar ratio (H2/C2-2) and wherein H2/C2-2 is from 0.01 to 0.20, alternatively 0.01 to 0.10, alternatively 0.01 to 0.05 lower than H2/C2-1; (ii) wherein the melt storage modulus G' (G"=3,000 Pa) (MSM2) for the second ethylene/alpha-olefin copolymer is from 500 to 5,000 Pa, alternatively from 1,950 to 2,150 Pa, alternatively from 2000.0 to 2,140 Pa, alternatively from 2,010 to 2,090 Pa, alternatively from 2,099 to 2,145 Pa; (iii) both (i) and (ii); (iv) wherein in step (b1) the reactor bed temperature RBT1 is decreased to the reactor bed temperature RBT2 and wherein RBT2 is from 1° to 5° C., alternatively from 1° to 3° C., alternatively from 1° to 2° C. lower than RBT1; and wherein in step (c) the H2/C2 gas molar ratio of the hydrogen and ethylene feeds is increased from H2/C2-1 to a second H2/C2 gas molar ratio (H2/C2-2) and wherein H2/C2-2 is from 0.01 to 0.20, alternatively 0.01 to 0.10, alternatively 0.01 to 0.05 higher than H2/C2-1; (v) both (ii) and (iv).

Aspect 7. The method of any one of aspects 1 to 6 wherein the Composition Distribution Breadth Index value (CDBI2) and density (ρ2) of the second ethylene/alpha-olefin copolymer is substantially unchanged from, alternatively the same as, the Composition Distribution Breadth Index value (CDBI1) and density (ρ1), respectively of the first ethylene/alpha-olefin copolymer.

Aspect 8. Use of reactor bed temperature, H2/C2 gas molar ratio, or flow index to transition a polymerization reaction using a same chromium-based catalyst system in a single gas-phase polymerization reactor from making a first ethylene/alpha-olefin copolymer having a first melt storage modulus G' (G"=3,000 Pa) (MSM1) to making a second ethylene/alpha-olefin copolymer having a second melt storage modulus G' (G"=3,000 Pa) (MSM2) that is substantially different than MSM1 without changing the alpha-olefin composition and without substantially changing the ethylene/alpha-olefin copolymer's density. In some aspects the CDBI2 of the second ethylene/alpha-olefin copolymer is substantially the same as CDBI1 of the first ethylene/alpha-olefin copolymer. As described, the use is performed without using a second reactor or substantially changing the chromium-based catalyst system.

Aspect 9. The use of aspect 8 further using a change in H2/C2 gas molar ratio to offset the change in reactor bed temperature in order to compensate the transitioning polymerization reaction by changing the melt storage modulus G' (G"=3,000 Pa) of the second ethylene/alpha-olefin copolymer from MSM2 to MSM1. In some aspects the CDBI2 of the second ethylene/alpha-olefin copolymer is substantially the same as CDBI1 of the first ethylene/alpha-olefin copolymer. As described, the use is performed without using a second reactor or substantially changing the chromium-based catalyst system.

Aspect 10. Use of any one of aspects 8 and 9 wherein the comonomer composition distribution (Composition Distribution Breadth Index) and density are substantially unchanged, alternatively the same.

Definitions

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Metallocene catalysts. Substantially single site or dual site catalytic molecules based on metal-cyclopentadienyl ligand complexes. Excluded from steps (a), (b1) to (b3), and (c) of the inventive methods and uses.

Post-metallocene catalysts. Substantially single site or dual site catalytic molecules based on metal-ligand complexes wherein the ligand is a substituted cyclopentadienyl or multidentate molecular anion. Excluded from steps (a), (b1) to (b3), and (c) of the inventive methods and uses.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator. Excluded from steps (a), (b1) to (b3), and (c) of the inventive methods and uses.

Transitioning Method Embodiments

Polymerization method step (a). In an illustrative pilot plant process for making the first ethylene/alpha-olefin copolymer, a gas-phase polymerization (GPP) reactor, such as a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of first ethylene/alpha-olefin copolymer. Configure the FB-GPP reactor with a recycle gas line for flowing a recycle gas stream. Fit the FB-GPP reactor with gas feed inlets and polymer product outlet. Introduce gaseous feed streams of ethylene and hydrogen together with alpha-olefin comonomer (e.g., 1-hexene) below the FB-GPP reactor bed into the recycle gas line. Control individual flow rates of ethylene ("C2"), hydrogen ("H2") and alpha-olefin (e.g., 1-hexene or "C6") to maintain a fixed comonomer to ethylene monomer gas molar ratio (Cx/C2, e.g., C6/C2) equal to a described value (e.g., 0.0050), a constant hydrogen to ethylene gas molar ratio ("H2/C2") equal to a described value (e.g., 0.0020), and a constant ethylene ("C2") partial pressure equal to a described value (e.g., 1,000 kPa). Measure concentrations of all gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT1 (e.g., 105° C.). Maintain the fluidized bed at a constant height by withdrawing a portion of the bed at a rate equal to the rate of production of particulate first ethylene/alpha-olefin copolymer, which production rate may be from 10 to 20 kilograms per hour (kg/hr), alternatively 13 to 18 kg/hr. Remove the product first ethylene/alpha-olefin copolymer semi-continuously via a series of valves into a fixed volume chamber, wherein this removed first ethylene/alpha-olefin copolymer is purged to remove entrained hydrocarbons and treated with a stream of humidified nitrogen ($N_2$) gas to deactivate any trace quantities of residual polymerization catalyst. See also polymerization method described later.

Polymerization method step (b1). Following step (a), the reactor bed temperature may be raised or lowered within a range of operating reactor bed temperature of from 90° to 120° C., alternatively from 95° to 115° C., alternatively from 99° to 110° C., alternatively from 100.0° to 109° C. In some aspects the CDBI2 of the second ethylene/alpha-olefin copolymer is substantially the same as CDBI1 of the first ethylene/alpha-olefin copolymer.

Polymerization method step (b2). Following step (a), the H2/C2 gas molar ratio may be decreased or increased within a range of operating H2/C2 gas molar ratio of from 0.0001 to 0.25, alternatively from 0.0005 to 0.200, alternatively from 0.005 to 0.149, alternatively from 0.009 to 0.109, alternatively from 0.010 to 0.100. In some aspects the CDBI2 of the second ethylene/alpha-olefin copolymer is substantially the same as CDBI1 of the first ethylene/alpha-olefin copolymer.

Polymerization method step (b3). Following step (a), the flow index of the ethylene/alpha-olefin copolymer may be decreased or increased within a range of operating flow index of from 5 to 16 g/10 min., alternatively from 8 to 13 g/10 min., alternatively from 8.90 to 12.30 g/10 min. To decrease flow index, the reactor bed temperature may be decreased, the average polymer residence time may be increased, or the O2/C2 gas volume ratio may be increased. Conversely, to increase flow index, the reactor bed temperature may be increased, the average polymer residence time may be decreased, or the O2/C2 gas volume ratio may be decreased. The reactor bed temperature may be increased or decreased within a range of reactor bed temperature of from 90° to 120° C., alternatively from 95° to 115° C., alternatively from 99° to 110° C., alternatively from 100.0° to 109° C. The first average polymer residence time (avgPRT1) may be decreased or increased within a range of from 1 to 5 hours, alternatively 1.5 to 3.4 hours, alternatively from 1.7 to 3.0 hours. The O2/C2 gas volume ratio may be decreased or increased within a range of from 0.0000 to 0.20 ppmv, alternatively from 0.0001 to 0.200 ppmv, alternatively from 0.0000 to 0.183 ppmv, alternatively from 0.0000 to 0.163 ppmv. decreasing or increasing oxygen (O2) flow relative to ethylene flow into the gas-phase polymerization reactor so as to decrease or increase the O2/C2 gas volume ratio from [O2/C2]1 to a second value [O2/C2]2, thereby. In some aspects the CDBI2 of the second ethylene/alpha-olefin copolymer is substantially the same as CDBI1 of the first ethylene/alpha-olefin copolymer.

Compensating Method Embodiments

Polymerization method steps (a) and (b1). As described above.

Polymerization method step (c). Before, during or after step (b1), the H2/C2 gas molar ratio may be decreased or increased within a range of operating H2/C2 gas molar ratio of from 0.0001 to 0.25, alternatively from 0.0005 to 0.200, alternatively from 0.005 to 0.149, alternatively from 0.009 to 0.109, alternatively from 0.010 to 0.100. In some embodiments the H2/C2-1 and H2/C2-2 are different and are each in the range of from 0.010 to 0.100.

Controlled Properties and Control Methods

Comonomer composition distribution may be characterized as a CDBI (Composition Distribution Breadth Index). A CDBI value represents the weight percent of the ethylene/alpha-olefin copolymer molecules having a comonomer content within 50% of the median total molar comonomer content. A relatively high CDBI value indicates that most of the copolymer molecules have a comonomer content that is within 50% of the median comonomer content, which further indicates that the copolymer polymers are relatively uniform in comonomer content. The CDBI value of a linear polyethylene homopolymer, which does not contain a comonomer, is defined to be 100%. Methods for calculating CDBI values of copolymers are known in the art, such as in WO 93/03093. When a CDBI value for a first copolymer is higher than that of a second copolymer, the higher CDBI value indicates that the comonomer distribution of the first copolymer is more controlled or limited than the comonomer distribution of the second copolymer. A CDBI value of a copolymer is readily calculated by data obtained from techniques known in the art, such as, for example, TREF (temperature rising elution fractionation) as described, for example, in U.S. Pat. No. 5,008,204 or in Wild et al., J. Poly. Sci. Polv. Phys. Ed., vol. 20, p. 441 (1982).

Without substantially changing CDBI value of the ethylene/alpha-olefin copolymer means the CDBI2 value is within plus-or-minus (±) 10.0%, alternatively ±5.0%, alternatively ±3.0%, alternatively ±2.0%, alternatively ±1.0%, alternatively ±0.90%, alternatively ±0.75%, alternatively ±0.50%, alternatively ±0.20%, alternatively ±0.01%, alternatively 0.00% of the CDBI1 value.

Without substantially changing comonomer/ethylene gas molar ratio (Cx/C2) of comonomer and ethylene being fed into the FB-GPP reactor means that the (Cx/C2) value in any one of steps (b1) to (b3) or steps (b1) and (c) does not vary by more than ±10.0%, alternatively ±5.0%, alternatively ±3.0%, alternatively ±2.0%, alternatively ±1.0%, alternatively ±0.90%, alternatively ±0.75%, alternatively ±0.50%, alternatively ±0.20%, alternatively ±0.01%, alternatively 0.00%.

Density is measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm$^3$). In some aspects the density is from 0.89 to 0.98 g/cm$^3$, alternatively from 0.92 to 0.97 g/cm$^3$, alternatively 0.940 to 0.960 g/cm$^3$.

Without substantially changing density of the ethylene/alpha-olefin copolymer means ρ2 is within ±0.004 g/cm$^3$, alternatively ±0.003 g/cm$^3$, alternatively ±0.002 g/cm$^3$, alternatively ±0.001 g/cm$^3$, alternatively ±0.0007 g/cm$^3$, alternatively ±0.0003 g/cm$^3$, alternatively ±0.0002 g/cm$^3$, alternatively ±0.0001 g/cm$^3$, alternatively ±0.0000 g/cm$^3$, of ρ1.

Flow Index (190° C., 21.6 kg, "$I_{21}$") Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.) or the equivalent in decigrams per 1.0 minute (dg/1 min.). Flow indexes $(I_{21})1$ of the first ethylene/alpha-olefin copolymer and $(I_{21})2$ of the second ethylene/alpha-olefin copolymer are different and may be from 0.1 to 50 g/10 min., alternatively 1 to 10 g/10 min., alternatively 0.1 to 3 g/10 min. The flow index is decreased or increased as described earlier for step (b3).

Gas molar ratio of comonomer to ethylene ("Cx/C2 gas molar ratio") is the quantity of all alpha-olefin comonomer(s) ("Cx"), in moles, being fed in a gaseous or vaporous state into the FB-GPP reactor divided by the quantity of ethylene monomer (C2), in moles, being fed in a gaseous state into the FB-GPP reactor.

Without substantially changing gas molar ratio of comonomer to ethylene (Cx/C2) being fed into the FB-GPP reactor means [Cx/C2]2 value is within ±1.4%, alternatively ±1.3%, alternatively ±1.2%, alternatively ±1.1%, alternatively ±1.00%, alternatively ±0.9%, alternatively ±0.7%, alternatively ±0.5%, alternatively ±0.4%, alternatively ±0.2%, alternatively ±0.1%, alternatively 0.00% of [Cx/C2]1. The moles of comonomer and moles of ethylene used to calculate the Cx/C2 gas molar ratio values are measured by gas flow meters or other suitable means.

Melt storage modulus G' (G"=3,000 Pa) is measured according to the Melt Storage Modulus Test Method described later. In some aspects melt storage modulus G' (G"=3,000 Pa) MSM1 and MSM2 of the first and second ethylene/alpha-olefin copolymers, respectively, independently are from 500 to 5,000 Pa, alternatively from 1,950 to 2,150 Pa, alternatively from 2000.0 to 2,140 Pa, alternatively from 2,010 to 2,090 Pa, alternatively from 2,099 to 2,145 Pa. In other aspects the MSM1 and MSM2 independently are from 3,000 to 10,000 Pa, alternatively from 5,000 to 8,000 Pa, alternatively from 5800 to 6800 Pa. In some aspects the alpha-olefin used to make the first and second ethylene/alpha-olefin copolymers is 1-butene, alternatively 1-hexene. All other things being equal, ethylene/1-hexene copolymers will have lower elastic modulus than that of ethylene/1-butene copolymers.

A substantial change in melt elasticity means a substantial change in melt storage modulus G' (G"=3,000 Pa). A substantial change in melt storage modulus G' (G"=3,000 Pa) means the MSM2 of the second ethylene/alpha-olefin copolymer is higher or lower than the MSM1 of the first ethylene/alpha-olefin copolymer by at least 10.0%, alternatively at least 15.0%, alternatively at least 20.0%, alternatively at least 30.0%, alternatively at least 50.0%, alternatively at least 90.0%, alternatively at least 100.0%, alternatively at least 200.0%, alternatively at least 500.0%, alternatively at least 1,000.0%; or the second melt elasticity value is lower than the first melt elasticity value by at least 10.0%, alternatively at least 15.0%, alternatively at least 20.0%, alternatively at least 30.0%, alternatively at least 40.0%, alternatively at least 50.0%, alternatively at least 60.0%, alternatively at least 70.0%, alternatively at least 80.0%, alternatively at least 90.0%. The farther the MSM2 value is from the MSM1 value, i.e., the greater the percentage difference of the MSM2 relative to the MSM1, the greater the change in melt storage modulus G' (G"=3,000 Pa), and thus of melt elasticity, therebetween.

Increasing reactor bed temperature from RBT1 to a higher value for RBT2, all other things being equal, decreases the melt storage modulus G' (G"=3,000 Pa) MSM1 of the first ethylene/alpha-olefin copolymer to a lower value for the melt storage modulus G' (G"=3,000 Pa) MSM2 of the second ethylene/alpha-olefin copolymer (MSM2 is less than MSM1). Decreasing reactor bed temperature from RBT1 to a lower value for RBT2, all other things being equal, increases the melt storage modulus G' (G"=3,000 Pa) MSM1 of the first ethylene/alpha-olefin copolymer to a higher value for the melt storage modulus G' (G"=3,000 Pa) MSM2 of the second ethylene/alpha-olefin copolymer (MSM2 is greater than MSM1).

Increasing H2/C2 gas molar ratio from H2/C2-1 to a higher value for H2/C2-2, all other things being equal, decreases the melt storage modulus G' (G"=3,000 Pa) MSM1 of the first ethylene/alpha-olefin copolymer to a lower value for the melt storage modulus G' (G"=3,000 Pa) MSM2 of the second ethylene/alpha-olefin copolymer (MSM2 is less than MSM1). Decreasing H2/C2 gas molar ratio from H2/C2-1 to a lower value for H2/C2-2, all other things being equal, increases the melt storage modulus G' (G"=3,000 Pa) MSM1 of the first ethylene/alpha-olefin copolymer to a higher value for the melt storage modulus G' (G"=3,000 Pa) MSM2 of the second ethylene/alpha-olefin copolymer (MSM2 is greater than MSM1).

Increasing flow index from the flow index value for the first ethylene/alpha-olefin copolymer to a higher flow index value for the second ethylene/alpha-olefin copolymer, all other things being equal, increases the melt storage modulus G' (G"=3,000 Pa) MSM1 of the first ethylene/alpha-olefin copolymer to a higher value for the melt storage modulus G' (G"=3,000 Pa) MSM2 of the second ethylene/alpha-olefin copolymer (MSM2 is greater than MSM1). Decreasing flow index from the flow index value for the first ethylene/alpha-olefin copolymer to a lower flow index value for the second ethylene/alpha-olefin copolymer, all other things being equal, decreases the melt storage modulus G' (G"=3,000 Pa) MSM1 of the first ethylene/alpha-olefin copolymer to a lower value for the melt storage modulus G' (G"=3,000 Pa) MSM2 of the second ethylene/alpha-olefin copolymer (MSM2 is less than MSM1).

Polymerization Conditions

Polymerization conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as H2 and/or O2, molar ratio of feed gases versus reactants, absence or concentration of interfering materials (e.g., $H_2O$), absence or presence of an induced condensing agent (ICA), first average polymer residence time (avgPRT1) in the reactor, partial pressures of constituents, feed rates of monomers, reactor bed temperature (e.g., fluidized bed temperature), nature or sequence of process steps, time periods for transitioning between steps. In performing an inventive method or use, variables other than that/those being described or changed by the inventive method or use may be kept constant.

Comonomer/ethylene gas molar ratio Cx/C2 of comonomer and ethylene being fed into the gas-phase polymerization (GPP) reactor may be from 0.0001 to 0.1, alternatively from 0.0002 to 0.05, alternatively from 0.0004 to 0.02.

Ethylene partial pressure (e.g., C2P1) in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene (H2/C2) gas molar ratios H2/C2-1 and H2/C2-2 in the FB-GPP reactor are different and otherwise independently are from 0.0001 to 0.25, alternatively from 0.0005 to 0.200, alternatively from 0.005 to 0.149, alternatively from 0.009 to 0.109, alternatively from 0.010 to 0.100.

Induced condensing agent (ICA). An inert liquid useful for cooling materials in the polymerization reactor(s) (e.g., a fluidized bed reactor). In some aspects the ICA is a $(C_5-C_{20})$alkane, alternatively a $(C_{11}-C_{20})$alkane, alternatively a $(C_5-C_{10})$alkane. In some aspects the ICA is a $(C_5-C_{10})$alkane. In some aspects the $(C_5-C_{10})$alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an induced condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %.

Oxygen ($O_2$) concentration relative to ethylene ("[O2/C2] 1", volume parts $O_2$ per million volume parts ethylene (ppmv)) in the FB-GPP reactor. In some embodiments the [$O_2$/C2]1 is from 0.0000 to 0.20 ppmv, alternatively from 0.0001 to 0.200 ppmv, alternatively from 0.0000 to 0.183 ppmv, alternatively from 0.0000 to 0.163 ppmv.

Reactor bed temperatures RBT1 and RBT2 in the FB-GPP reactor are different and may be from 90° to 120° C., alternatively from 95° to 115° C., alternatively from 99° to 110° C., alternatively from 100.0° to 109° C.

Residence time, average for the ethylene/alpha-olefin copolymer (avgPRT). The number of minutes or hours on average the ethylene/alpha-olefin copolymer product resides in the FB-GPP reactor, e.g., the FB-GPP reactor. In some aspects the avgPRT1 is from 30 minutes to 10 hours, alternatively from 60 minutes to 5 hours, alternatively from 90 minutes to 4 hours, alternatively from 1.7 to 3.0 hours.

Polymerization Method

The polymerization method uses a gas-phase polymerization (GPP) reactor, such as a stirred-bed gas-phase polymerization reactor (SB-GPP reactor) or a fluidized-bed gas-phase polymerization reactor (FB-GPP reactor), to make the inventive ethylene/alpha-olefin copolymer. Such reactors and methods are generally well-known in the art. For example, the FB-GPP reactor/method may employ the induced condensing agent and be conducted in condensing mode polymerization such as described in U.S. Pat. Nos. 4,453,399; 4,588,790; 4,994,534; 5,352,749; 5,462,999; and 6,489,408. The GPP reactor/method may be a fluidized-bed gas-phase polymerization reactor (FB-GPP reactor)/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent, a promoter, or a scavenging agent. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the chromium-based catalyst system.

In an embodiment the method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The chromium-based catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Chromium-Based Catalyst System

Chromium-based catalyst system. Inventive embodiments may be described by the following chromium-based catalyst system. The chromium-based catalyst system comprises a chromium-based catalyst compound and, optionally, one or more of a modifying agent, a reducing agent, an activator, and a support material. Typically, the chromium-based catalyst compound is activated by heating as described later.

Chromium-based catalyst system, same. The expression "same chromium-based catalyst system" means the composition of the chromium-based catalyst system fed into the GPP reactor for performing any one of steps (b1) to (b3) or steps (b1) and (c) is essentially unchanged from that fed into the GPP reactor for performing step (a) of the respective inventive methods and uses. Said differently, the change in melt elasticity, melt storage modulus G' (G"=3,000 Pa), of the ethylene/alpha-olefin copolymer is not a result of a change in the composition of the chromium-based catalyst system.

The chromium-based catalyst system comprises any chromium-based catalyst compound that is effective for enhancing polymerization of ethylene and/or alpha-olefin. In some embodiments the chromium-based catalyst compound comprises a chromium oxide catalyst compound, a silyl chromate catalyst compound, a reduced chromium oxide catalyst compound, or a combination or reaction product of any two or more thereof. The combination may comprise a silyl chromate catalyst compound and a chromium oxide catalyst compound, or a reaction product thereof. The chromium-based catalyst system may further comprise an activator. Alternatively, the chromium-based catalyst system may comprise a reaction product of the chromium-based catalyst compound and the activator. The chromium-based catalyst system may be unsupported, that is free of a support material. The support material differs from the activator and the chromium-based catalyst compound in at least one of function (e.g., reactivity), composition (e.g., metal content), and property such as porosity.

Alternatively, the chromium-based catalyst system may further comprise a support material for hosting the chromium-based catalyst compound and/or an activator. The chromium-based catalyst compound of the chromium-based catalyst system may be activated by any suitable method, which may or may not employ an activator, and under any suitable activating conditions, as described later.

The chromium oxide catalyst compound comprises $CrO_3$ or any chromium compound convertible to $CrO_3$ under catalyst activating conditions. Compounds convertible to $CrO_3$ are disclosed in, for example, U.S. Pat. Nos. 2,825,721; 3,023,203; 3,622,251; and 4,011,382. Examples are chromic acetyl acetonate, chromic halide, chromic nitrate, chromic acetate, chromic sulfate, ammonium chromate, ammonium dichromate, and other soluble, chromium containing salts. Chromium oxide catalyst compounds include Philips-type catalyst compounds, commonly referred to as "inorganic oxide-supported $Cr^{+6}$" catalysts. A Philips-type catalyst compound may be formed by a process that includes impregnating a $Cr^{+3}$ compound into a silica support, followed by calcining the impregnated silica support under oxidizing conditions at 300° to 900° C., alternatively, 400° to 860° C. to give the Philips-type catalyst compound. Under these conditions, at least some of the $Cr^{+3}$ are converted to $Cr^{+6}$.

The silyl chromate catalyst compound may be a bis(trihydrocarbylsilyl) chromate or a poly(diorganosilyl) chromate. The bis(trihydrocarbylsilyl) chromate may be bis(triethylsilyl) chromate, bis(tributylsilyl) chromate, bis(triisopentylsilyl) chromate, bis(tri-2-ethylhexylsilyl) chromate, bis(tridecylsilyl) chromate, bis(tri(tetradecyl)silyl) chromate, bis(tribenzylsilyl) chromate, bis(triphenylethylsilyl) chromate, bis(triphenylsilyl) chromate, bis(tritolylsilyl) chromate, bis(trixylylsilyl) chromate, bis(trinaphthylsilyl) chromate, bis(triethylphenylsilyl) chromate, or bis(trimethylnaphthylsilyl) chromate. The poly(diorganosilyl) chromate may be polydiphenylsilyl chromate or polydiethylsilyl chromate. In some embodiments, the silyl chromate compound is bis(triphenylsilyl) chromate, bis(tritolylsilyl) chromate, bis(trixylylsilyl) chromate, or bis(trinaphthylsilyl) chromate; alternatively bis(triphenylsilyl) chromate. See U.S. Pat. Nos. 3,324,101; 3,704,287; and 4,100,105.

Supported catalyst compounds. The chromium-based catalyst compound, such as the chromium oxide catalyst compound, the silyl chromate catalyst compound, and/or the reduced chromium oxide catalyst compound, independently may be unsupported, i.e., free of a support material. Alternatively, the chromium-based catalyst compound, such as the chromium oxide catalyst compound, the silyl chromate catalyst compound, or the reduced chromium oxide catalyst compound, may be disposed on a support material. That is, the chromium-based catalyst system may comprise the chromium-based catalyst compound and support material. Typically, the supported reduced chromium oxide catalyst compound is made in situ by contacting a pre-activated and supported chromium oxide catalyst compound, optionally modified with a silyl chromate catalyst compound, with a reducing agent to give an activated and supported reduced chromium oxide catalyst compound.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from a number of sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, all of these silicas are not calcined (i.e., not dehydrated). Silica that is calcined prior to purchase may also be used as the support material.

Supported chromium compounds, such as, for example, supported chromium acetate, are commercially available and may be used as an embodiment of the chromium-based catalyst system. Commercial examples include Davison 957, Davison 957HS, and Davison 957BG products from Davison Chemical Division, and ES370 product from PQ Corp. The supported chromium compound may in the form of spherical particles, which are obtained by a spray-drying process. Alternatively, C35100MS and C35300MS products from PQ Corporation are not spray-dried. As procured, all of these silicas are not activated. Supported chromium compounds that are activated prior to purchase may be used as the supported chromium compound.

Prior to being contacted with a chromium oxide catalyst compound, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. In some aspects the support material is a calcined support material.

In some embodiments the supported chromium oxide catalyst system further comprises a silyl chromate compound as a modifying agent. As such, the silyl chromate compound may be added to a slurry of the activated (unsupported or supported) chromium oxide catalyst system in a non-polar aprotic solvent to give a slurry of a modified activated supported chromium oxide catalyst system. The solvent may be removed by heating, optionally under reduced pressure, according to the drying process described later.

Catalyst activation. Any one of the foregoing chromium oxide catalyst compounds or silyl chromate catalyst compound, whether unsupported or supported on an uncalcined or calcined support material, independently may be activated by heating in an oxidative environment (e.g., well-dried air or oxygen) at an activation temperature of from 300° C. or higher with the proviso that the maximum activation temperature is below that at which substantial sintering of the compounds and/or support material would occur. The activating gives an activated (unsupported or supported) chromium oxide catalyst compound and/or an activated (unsupported or supported) silyl chromate catalyst compound. For example to activate the Philips catalyst, a fluidized bed of the supported chromium oxide catalyst compound may be activated by passing a stream of dry air or oxygen therethrough, thereby displacing any water therefrom and converting at least some $Cr^{+3}$ compound to $Cr^{+6}$ compound. The maximum activation temperature may be from 300° to 900° C., alternatively 400° to 850° C., alternatively from 500° to 700° C., alternatively from 550° to 650° C. The activation time period may be from 1 to 48 hours, alternatively from 1 to 36 hours, alternatively from 3 to 24 hours, alternatively from 4 to 6 hours. All other things being equal, the higher the activation temperature used, the shorter the activation period of time to achieve a given level of activation, and vice versa. The resulting activated (unsupported or supported) chromium oxide catalyst system may be in the form of a powdery, free-flowing particulate solid.

The reduced chromium oxide catalyst compound. An activated (unsupported or supported) reduced chromium oxide catalyst compound and system may be prepared from the activated (unsupported or supported) chromium oxide catalyst system. In one embodiment, the activated (unsupported or supported) chromium oxide catalyst system has been prepared from a calcined support material. The activated (unsupported or supported) chromium oxide catalyst system may be unmodified, alternatively may have been modified by the silyl chromate compound according to the modifying method described earlier. The preparing comprises agitating a slurry of the activated (unsupported or supported) chromium oxide catalyst system in a non-polar, aprotic solvent under an inert atmosphere, adding a reducing agent to the agitated slurry over a period of time (addition time), and then allowing the resulting reaction mixture to react under the inert atmosphere for a period of time (reaction time) to make the activated (unsupported or supported) reduced chromium oxide catalyst compound and system, which typically is supported on the support material, as a slurry in the non-polar, aprotic solvent. The inert atmosphere may comprise anhydrous $N_2$ gas, Ar gas, He gas, or a mixture thereof. The inert atmosphere may be at a pressure from 101 to 700 kilopascals (kPa). The temperature of the agitated slurry during the adding step may be from 30° to 80° C., alternatively from 40° to 60° C. The agitation may be performed at a rate less than 70 rotations per minute (rpm) and the addition time may be less than 20 minutes. Alternatively, the agitation rate may be greater than 70 rpm and the addition time may be less than 20 minutes. Alternatively, the agitation rate may be greater than 70 rpm and the addition time may be greater than 20 minutes. The agitation rate may be from 30 to 50 rpm, and the addition time may be from 20 to 80 minutes. The temperature of the reaction mixture during the allowing step may be from 20° to 80° C., alternatively from 20° to 60° C., alternatively from 20° to 40° C. The reaction time period may be from 0.08 to 2 hours.

The reducing agent may be an organoaluminum compound, such as an aluminum alkyl or an alkyl aluminum alkoxide. The alkyl aluminum alkoxide may be of formula $R_2AlOR$, wherein each R is independently an unsubstituted $(C_1-C_{12})$alkyl group, alternatively unsubstituted $(C_1-C_{10})$ alkyl group, alternatively unsubstituted $(C_2-C_8)$alkyl group, alternatively unsubstituted $(C_2-C_4)$alkyl group. Examples of the alkyl aluminum alkoxides are diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide and mixtures thereof. In one aspect the reducing agent is diethyl aluminum ethoxide (DEAIE).

The non-polar, aprotic solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. The non-polar, aprotic solvent may be a mixture of at least one acyclic alkane and at least one cyclic alkane.

Thereafter, the slurry of the activated (unsupported or supported) reduced chromium oxide catalyst compound and system may be dried to remove the non-polar, aprotic solvent. The drying comprises heating the slurry, optionally under reduced pressure, and in an environment that excludes oxidizing contaminants such as air or oxygen. The drying process transitions the activated (unsupported or supported) reduced chromium oxide catalyst compound and system from a viscous slurry to a partially dried slurry or mud to a free-flowing powder. Helical ribbon agitators may be used in vertical cylindrical blenders to accommodate the varying mixture viscosities and agitation requirements. Drying may be conducted at pressures above, below, or at normal atmospheric pressure as long as contaminants such as oxygen are strictly excluded from the activated (unsupported or supported) reduced chromium oxide catalyst compound and system. Drying temperatures may range from 0° to 100° C., alternatively from 40° to 85° C., alternatively from 55° to 75° C. Drying times may be from 1 to 48 hours, alternatively from 3 to 26 hours, alternatively from 5 to 20 hours. All other things being equal, the higher the drying temperature and/or lower the drying pressure, the shorter the drying time, and vice versa. After drying, the activated (unsupported or supported) reduced chromium oxide catalyst compound and system may be stored under an inert atmosphere until use.

Activator. Also referred to as a co-catalyst, an activator is a compound that enhances the catalytic performance of a catalyst. Aluminum alkyls may be used as activators for reduced chromium oxide catalyst compounds. The aluminum alkyl may also be used to improve the performance of the activated (unsupported or supported) reduced chromium oxide catalyst compound and system. The use of an aluminum alkyl allows for variable control of side branching in the polymer product, and desirable catalyst productivities. The aluminum alkyl may be applied to the reduced chromium oxide catalyst compound directly before the latter is fed into the GPP reactor. Alternatively, the reduced chromium oxide catalyst compound and aluminum alkyl may be fed separately into the GPP reactor, wherein they contact each other in situ, which may shorten or eliminate any catalyst induction time. See U.S. Pat. No. 7,504,467 B2.

During the inventive method or use, the chromium-based catalyst system, once activated, may be fed into the GPP reactor as a dry powder, alternatively as a slurry in a non-polar, aprotic solvent, which is as described above.

Chromium oxide catalyst compounds and reduced chromium oxide catalyst compounds and methods of preparation thereof, as well as characteristics of the polymer products formed therefrom, are described in U.S. Pat. No. 6,989,344; US 2011/0010938 A1; US 2016/0297907 A1; or WO 2017/132092 A1.

In some embodiments the chromium-based catalyst system comprises the reduced chromium oxide catalyst system. In some embodiments the reduced chromium oxide catalyst system comprises ACCLAIM™ K-100 catalyst system, ACCLAIM™ K-110 catalyst system, or ACCLAIM™ K-120 catalyst system. In some embodiments the chromium-based catalyst system comprises the silyl chromate catalyst system. In some embodiments the silyl chromate catalyst system comprises a bis(triphenylsilyl) chromate. In some embodiments the bis(triphenylsilyl) chromate comprises a UCAT™ G-150 catalyst system. The ACCLAIM™ and UCAT™ catalyst systems are all available from Univation Technologies, LLC, Houston, Tex., USA. The UCAT™ G-150 catalyst system is prepared as described in paragraph [0134] of WO 2017/132092 A1 or paragraphs [0072] to [0072] of US 2016/0297907 A1.

The ACCLAIM™ K-100, K-110, and K-120 catalyst systems may be prepared on commercial scales as follows. The preparations varying slightly depending on a small differences in concentrations of aluminum (DEALE) used thereon in Part (B), described later. Part (A): activation of supported chromium oxide catalyst system as a powder. Charge a fluidized bed heating vessel with a quantity of a porous silica support containing about 5 wt % chromium acetate (Grade C35300MSF chromium on silica, produced by PQ Corporation), which amounts to about 1 wt % Cr content, having a particle size of about 82 micrometers ($\mu$m) and a surface area of about 500 m$^2$/g. Heat up the vessel contents at a rate of about 50° C. per hour under a dry nitrogen stream up to 200° C., and hold at that temperature for about 4 hours. Next, further heat up the vessel contents at a rate of about 50° C. per hour under dry nitrogen to 450° C., and hold at that temperature for about 2 hours. Replace the dry nitrogen stream with a stream of dry air, and heat the vessel contents at a rate of about 50° C. per hour to 600° C., and maintain at 600° C. for about 6 hours to give activated chromium oxide catalyst. Cool the activated catalyst dry air stream (at ambient temperature) to about 300° C., replace the dry air stream with a dry nitrogen stream and further cool from 300° C. to room temperature under the dry nitrogen stream (at ambient temperature). The resulting cooled, activated supported chromium oxide catalyst system is a powder. Store the powder under dry nitrogen atmosphere in a mixing vessel until used in Part (B).

Part (B) reduction of activated chromium oxide catalyst system to give ACCLAIM™ K-100, K-110, or K-120 catalyst system. For pilot scale, fit a vertical catalyst blender with a double helical ribbon agitator, and charge with about 0.86 kg of the powder form of the activated supported chromium oxide catalyst of Part (A) under an inert atmosphere. Add dried hexane or isopentane solvent (7.1 L solvent per kg of powder) to adequately suspend the powder and form a slurry. Agitate the slurry, warm to approximately 45° C., and add a 25 wt % solution of DEAIE (Akzo Nobel) in isopentane or hexane above the surface of the catalyst slurry at a rate so that the addition occurs over about a 40 minutes time period to obtain a selected wt % aluminum loading on the powder, wherein the wt % aluminum loading is different depending upon whether ACCLAIM™ K-100, K-110, or K-120 catalyst system is being prepared. Further agitate the resulting at a controlled rate for about 1 hour on a pilot scale or 2 hours on a commercial scale. Then substantially remove the solvent from the resulting reaction mixture by drying at a selected jacket temperature for about 16 to 21 hours. Select the jacket temperature to give a material temperature that lines out near a target of 61°, 64°, 71°, or 81° C. during the later hours of drying, typically 16 hours for pilot scale. As drying time goes on, apply a progressively stronger vacuum to the vessel. The reduced chromium oxide catalyst system comprising ACCLAIM™ K-100, K-110, or K-120 catalyst system is obtained as a dry, free-flowing powder, which is stored in a container under dry nitrogen pressure until used in a polymerization reaction.

Ethylene/Alpha-Olefin Copolymer

Inventive embodiments may be described by the following features of the ethylene/alpha-olefin copolymer.

Alpha-olefin. A compound of formula (I): $H_2C=C(H)-(CH_2)_x-CH_3$ (I), wherein subscript x is an integer of 3 or greater, or a combination of any two or more such compounds. Each of the two or more such compounds have a different value for subscript x than the other such compounds. When x is from 3 to 40, the alpha-olefin is a $(C_3-C_{40})$alpha-olefin, also depicted as a Cx alpha-olefin wherein x is from 3 to 40. In some embodiments the alpha-olefin is the $(C_3-C_{40})$alpha-olefin; alternatively a $(C_3-C_{30})$alpha-olefin; alternatively a $(C_3-C_{20})$alpha-olefin; alternatively a $(C_3-C_{10})$alpha-olefin; alternatively a $(C_3-C_8)$alpha-olefin; alternatively a $(C_4-C_8)$alpha-olefin; alternatively at least one of $(C_4)$alpha-olefin, $(C_6)$alpha-olefin, and $(C_8)$ alpha-olefin; alternatively at least one of $(C_4)$alpha-olefin and $(C_6)$alpha-olefin; alternatively at least one of $(C_4)$alpha-olefin and $(C_8)$alpha-olefin; alternatively at least one of $(C_6)$alpha-olefin and $(C_8)$alpha-olefin; alternatively (C4)alpha-olefin; alternatively (C6)alpha-olefin; alternatively (C8) alpha-olefin; alternatively $(C_3)$alpha-olefin; alternatively $(C_3)$alpha-olefin, in combination with 1,4-butadiene. Examples of the alpha-olefin are 1-propene (($C_3$)alpha-olefin), 1-butene ((C4)alpha-olefin), 1-hexene (($C_6$)alpha-olefin), or 1-octene (($C_8$)alpha-olefin); alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The alpha-olefin used as a comonomer to make the first ethylene/alpha-olefin copolymer may be the same as the alpha-olefin used as the second comonomer to make the second ethylene/alpha-olefin copolymer. In some embodiments the alpha-olefin is 1-butene, alternatively 1-hexene.

Ethylene. A compound of formula $H_2C=CH_2$. A polymerizable monomer.

Ethylene/alpha-olefin copolymer. A macromolecule, or collection of macromolecules, composed of repeat units wherein 50 to <100 mole percent (mol %), alternatively 70 to 99.99 mol %, alternatively 80 to 99.9 mol % of such repeat units are derived from ethylene monomer, and from >0 to 50 mol %, alternatively from 0.01 to 30 mol %, alternatively 0.1 to 20 mol % of the remaining repeat units are comonomeric units derived from at least one alpha-olefin; or collection of such macromolecules.

The following apply unless indicated otherwise. Alternatively precedes a distinct embodiment. ASTM means the standards organization, ASTM International, West Conshohocken, Pa., USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C.

Examples

Density: ASTM D792-13, Method B.

Flow index: ASTM D1238-13 (190° C., 21.6 kg, "$I_{21}$").

Melt Storage Modulus Test Method: On polymer melts at 190° C. perform small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G' (G"=3,000 Pa) value in pascals of melt storage modulus (G') at a dynamic frequency where loss modulus (G") is equal to 3,000 Pa.

Antioxidant 1: pentaerythritol tetrakis(3-(3,5-di-tert-butyl-4-hydroxyphenyl)propionate. IRGANOX 1010 from BASF.

Antioxidant 2: tris(2,4-di-tert-butylphenyl)phosphite. E.g., Irgafos 168.

Catalyst Neutralizer 1: calcium stearate.

Catalyst Neutralizer 2: zinc stearate.

Chromium-based Catalyst system 1: the ACCLAIM™ K-110 catalyst system.

Comonomer 1: 1-butene. See later for C4/C2 gas molar ratio.

Comonomer 2: 1-Hexene. See later for C6/C2 gas molar ratio.

Ethylene ("C2"): See below later for partial pressure of C2.

Induced condensing agent 1 ("ICA1"): isopentane, used at a mole percent (mol %) concentration in the gas phase of a gas phase reactor relative to the total molar content of gas phase matter. Reported later.

Molecular hydrogen gas ("H2"): See later for H2/C2 gas molar ratio.

Molecular oxygen gas ("O2"): See later for O2/C2 gas volume ratio.

The polymerization reactor and method is the Pilot Reactor described earlier.

Ethylene/1-butene copolymer 1: target density is 0.948 to 0.949 g/cm$^3$ and target flow index ($I_{21}$) is 9 to 10 g/10 minutes.

Ethylene/1-hexene copolymer 1: target density is 0.948 to 0.949 g/cm$^3$ and target flow index ($I_{21}$) is 9 to 12 g/10 minutes.

Inventive Example 1: transitioning a copolymerization of ethylene and 1-butene.

Inventive Example 2: transitioning a copolymerization of ethylene and 1-hexene.

Polymerization Procedure: Runs began with ACCLAIM™ K-110 Catalyst and comonomer=1-hexene on Part G7, and followed the order G7, G8, G6, G5, G9, G1, G2. Runs were stopped on Part G2 due to a blockage in top of the cooler of the Pilot Reactor. After approximately 7 days, reactor was restarted with a carbon dioxide/TMA passivation (TMA is trimethylaluminum) and short bake at 108° C., and runs continued with comonomer =1-hexene, except with ACCLAIM™ K-100 Catalyst, from Part G2, G3, G4; then comonomer was transitioned to 1-butene and runs continued ACCLAIM™ K-100 Catalyst, H4, H3, H2, H1, H9, H7, H8, H6, H5. During all Parts target density is 0.948 to 0.949 g/cm$^3$ and target flow index ($I_{21}$) is 9 to 12 g/10 minutes.

Formulation and Pelletization Procedure: Each of the granular resin parts (G1-G9 and H1-H9) was separately mixed together with 1,300 parts per million weight/weight (ppm) of Antioxidant 1, 1,300 ppm Antioxidant 2, 1,500 ppm Catalyst Neutralizer 1, and 700 ppm Catalyst Neutralizer 2 in a ribbon blender, and then compounded into strand cut pellets using a twin-screw extruder ZSK-40. The resulting pellets were tested for flow index ($I_{21}$), density, and melt storage modulus G' (G"=3,000 Pa) according to their aforementioned respective test methods. Results are reported later.

TABLE 1

Common operating parameters for IE1 and IE2.

| Reaction Constituent/Parameter | IE1 and IE2 |
|---|---|
| Pilot Reactor (gas phase polymerization) | single, continuous-mode, fluidized bed |
| Starting seedbed = granular HDPE resin | Preloaded in reactor |
| Bed weight | 40 to 50 kg |
| Reactor Purging method | Anhydrous $N_2$ gas |
| Ethylene ("C2") partial pressure | 1379 kPa |
| Induced Condensing Agent 1 | 0.01 to 0.02 mol % isopentane |
| Cr-Based Catalyst System 1 | ACCLAIM ™ K-110 (Parts G7, G8, G6, G5, G9, G1, G2) |
| K-110 Catalyst loading (Cr, wt %) | 0.843 |
| K-110 Al concentration (Al, wt %) | 1.392 |
| Cr-Based Catalyst System 2 | ACCLAIM ™ K-100 (Parts G2, G3, G4, H4, H3, H2, H1, H9, H7, H8, H6, H5) |
| K-100 Catalyst loading (Cr, wt %) | 0.843 |
| K-100 Al concentration (Al, wt %) | 1.392 |

The order of the Parts run is as follows: G7, G8, G6, G5, G9, G1, G2, G3, G4, H4, H3, H2, H1, H9, H7, H8, H6, H5.

Complex viscosity (η*) in pascal-seconds (Pa·s) at 126 rad./s for resins G1 to G9: G1 1781, G2 1639, G3 1581, G4 1739, G5 1533, G6 1643, G7 1712, G8 1472, G9 1656; and for resins H1 to H9: H1 1762, H2 1642, H3 1523, H4 1684, H5 1477, H6 1735, H7 1587, H8 1512, H9 1638.

The elastic modulus is the DMS (Dynamic Mechanical Spectroscopy) G' at G"=3000 in units of Pascals. The data in Tables 2 and 3 were analyzed by JMP software and discovered to depend on four of five reactor variables investigated: reaction temperature; H2/C2 gas molar ratio ("H2/C2"); flow index ("FI"); and comonomer, whether 1-butene ("C4"=+1) or 1-hexene ("C6"=−1). The fifth variable, average residence time of resin product, does not show an effect. The oxygen add-back floats and is assumed to not affect the elastic modulus. The Cx/C2 gas molar ratio does not greatly affect elastic modulus based on the results. Three forms of the model are fit to an equation, with an $R^2$ of about 0.98. The equation can be expressed by: G' (G"=3000)=6247.4−40.64*(reactor bed temperature)−1666*(H2/C2)+16.11*(FI)+15.93*(C4 or C6), wherein symbol * indicates multiplication and symbol+indicates addition. In some aspects the method or use produces an ethylene/alpha-olefin copolymer described by the elastic modulus as defined by the equation.

TABLE 2

Reactor parameters and polymer properties for IE1 runs.

| Run No. | Bed Temp. (° C.) | Polymer Res. Time (hour) | H2/C2 (mol/mol) | O2/C2 (ppmv) | C4/C2 (mol/mol) | I21 (g/10 min.) | Density (g/cm³) | G' (G" = 3,000 Pa) (Pa) |
|---|---|---|---|---|---|---|---|---|
| H1 | 109 | 2.91 | 0.010 | 0.0470 | 0.00959 | 9.03 | 0.9482 | 1953 |
| H2 | 109 | 2.81 | 0.099 | 0.0486 | 0.01100 | 12.18 | 0.9479 | 1840 |
| H3 | 109 | 1.64 | 0.010 | 0.0775 | 0.01138 | 12.17 | 0.9483 | 2006 |
| H4 | 107 | 1.78 | 0.079 | 0.0000 | 0.01145 | 10.27 | 0.9478 | 1949 |
| H5 | 102 | 2.89 | 0.020 | 0.1623 | 0.01743 | 11.93 | 0.9483 | 2259 |
| H6 | 100 | 2.96 | 0.100 | 0.0841 | 0.01480 | 8.93 | 0.9479 | 2162 |
| H7 | 100 | 1.68 | 0.010 | 0.1382 | 0.01612 | 9.07 | 0.9479 | 2366 |
| H8 | 100 | 1.66 | 0.099 | 0.0959 | 0.01638 | 11.92 | 0.9479 | 2246 |
| H9 | 104.5 | 2.41 | 0.055 | 0.0864 | 0.01287 | 10.48 | 0.9484 | 2097 |

TABLE 3

Reactor parameters and polymer properties for IE2 runs.

| Run No. | Bed Temp. (° C.) | Polymer Res. Time (hour) | H2/C2 (mol/mol) | O2/C2 (ppmv) | C6/C2 (mol/mol) | I21 (g/10 min.) | Density (g/cm³) | G' (G" = 3,000 Pa) (Pa) |
|---|---|---|---|---|---|---|---|---|
| G1 | 109 | 3.03 | 0.010 | 0.0467 | 0.00413 | 9.01 | 0.9478 | 1957 |
| G2 | 109 | 3.12 | 0.099 | 0.0633 | 0.00400 | 12.08 | 0.9479 | 1802 |
| G3 | 109 | 1.74 | 0.010 | 0.0763 | 0.00410 | 12.03 | 0.9479 | 2009 |
| G4 | 107 | 1.74 | 0.079 | 0.0000 | 0.00393 | 10.18 | 0.9481 | 1929 |
| G5 | 102 | 3.08 | 0.020 | 0.1825 | 0.00701 | 12.00 | 0.9480 | 2232 |
| G6 | 100 | 2.91 | 0.099 | 0.1205 | 0.00675 | 9.10 | 0.9478 | 2152 |
| G7 | 100 | 1.72 | 0.010 | 0.1332 | 0.00630 | 9.00 | 0.9480 | 2238 |
| G8 | 100 | 1.59 | 0.098 | 0.1580 | 0.00638 | 12.26 | 0.9484 | 2226 |
| G9 | 104.5 | 2.34 | 0.053 | 0.0657 | 0.00550 | 10.46 | 0.9479 | 2090 |

The invention claimed is:

1. A method of transitioning a polymerization reaction making an ethylene/alpha-olefin copolymer with a same chromium-based catalyst system in a single gas-phase polymerization reactor operating at a first reactor bed temperature, a first average polymer residence time, and a first ethylene partial pressure and receiving an ethylene feed, a comonomer feed, a hydrogen feed, and, optionally, an oxygen feed, wherein the feeds are characterized by a first H2/C2 gas molar ratio, a comonomer/ethylene gas molar ratio, and a first O2/C2 gas volume ratio (vol/vol expressed in parts per million by volume (ppmv)); the method comprising:
   (a) making, in the reactor under first polymerization conditions comprising the first H2/C2 gas molar ratio, the comonomer/ethylene gas molar ratio, the first O2/C2 gas volume ratio, the first reactor bed temperature, and the first ethylene partial pressure, a first ethylene/alpha-olefin copolymer having a first melt storage modulus G' (G"=3,000 Pa) value measured according to the Melt Storage Modulus Test Method, a first Composition Distribution Breadth Index value, a first density, and a first flow index; followed by (b1), (b2), or (b3):
   (b1) raising or lowering the reactor bed temperature in the gas-phase polymerization reactor from the first reactor bed temperature to a second reactor bed temperature, which is from 1 to 10 degrees Celsius (° C.) higher or lower than the first reactor bed temperature; or
   (b2) decreasing or increasing, respectively, the H2/C2 gas molar ratio of the hydrogen and ethylene feeds from the first H2/C2 gas molar ratio to a second H2/C2 gas molar ratio, which is from 0.01 to 0.20 lower or higher than the first H2/C2 gas molar ratio, in such a way that the comonomer/ethylene gas molar ratio is unchanged; or
   (b3) decreasing or increasing the flow index of the ethylene/alpha-olefin copolymer from the first flow index to a second flow index, which is from 0.1 to 5 grams per 10 minutes (g/10 min.) lower or higher than the first flow index;
   wherein steps (a) and any one of (b1) to (b3) are conducted at the same comonomer/ethylene gas molar ratio; thereby substantially changing the melt storage modulus G' (G"=3,000 Pa) of the ethylene/alpha-olefin copolymer without using a different alpha-olefin in the comonomer feed and without substantially changing its density.

2. The method of claim 1 comprising steps (a) and (b1) and any one of limitations (i) to (iii):
   (i) wherein in step (b1) the first reactor bed temperature is increased or decreased to the second reactor bed temperature and wherein the second reactor bed temperature is from 1° to 5° C. higher or lower, respectively than the first reactor bed temperature;
   (ii) wherein the second ethylene/alpha-olefin copolymer has a second melt storage modulus G' (G"=3,000 Pa) of from 500 to 5,000 Pascals (Pa), wherein the second melt storage modulus G' (G"=3,000 Pa) is substantially different than the first melt storage modulus G' (G"=3,000 Pa); and
   (iii) both (i) and (ii).

3. The method of claim 1 comprising steps (a) and (b2) and any one of limitations (i) to (iii):
   (i) wherein in step (b2) the H2/C2 gas molar ratio of the hydrogen and ethylene feeds is decreased or increased, respectively, from the first H2/C2 gas molar ratio to a second H2/C2 gas molar ratio and wherein the second H2/C2 gas molar ratio is from 0.01 to 0.20 lower or higher, respectively, than the first H2/C2 gas molar ratio;
   (ii) wherein the second ethylene/alpha-olefin copolymer has a second melt storage modulus G' (G"=3,000 Pa) of from 500 to 5,000 Pascals (Pa), wherein the second melt storage modulus G' (G"=3,000 Pa) is substantially different than the first melt storage modulus G' (G"=3,000 Pa); and
   (iii) both (i) and (ii).

4. The method of claim 1 comprising steps (a) and (b3) and any one of limitations (i) to (iii):
   (i) wherein in step (b3) the first flow index of the first ethylene/alpha-olefin copolymer is increased or decreased to the second flow index of the second ethylene/alpha-olefin copolymer, wherein the first flow index is from 0.1 to 5 g/10 min. higher or lower, respectively, than the second flow index;
   (ii) wherein the second ethylene/alpha-olefin copolymer has a second melt storage modulus G' (G"=3,000 Pa) of from 500 to 5,000 Pascals (Pa), wherein the second melt storage modulus G' (G"=3,000 Pa) is substantially different than the first melt storage modulus G' (G"=3,000 Pa); and
   (iii) both (i) and (ii).

5. A method of compensating a transitioning polymerization reaction making an ethylene/alpha-olefin copolymer with a same chromium-based catalyst system in a single gas-phase polymerization reactor operating at a first reactor bed temperature, a first average polymer residence time, and a first ethylene partial pressure and receiving an ethylene feed, a comonomer feed, a hydrogen feed, and, optionally, an oxygen feed wherein the feeds are characterized by a first H2/C2 gas molar ratio, a comonomer/ethylene gas molar ratio, and a first O2/C2 gas volume ratio (vol/vol in ppmv); the method comprising:
   (a) making, in the reactor under first polymerization conditions comprising the first H2/C2 gas molar ratio, the comonomer/ethylene gas molar ratio, the first O2/C2 gas volume ratio, the first reactor bed temperature, and the first ethylene partial pressure, a first ethylene/alpha-olefin copolymer having a first melt storage modulus G' (G"=3,000 Pa) value measured according to the Melt Storage Modulus Test Method, a first Composition Distribution Breadth Index value, a first density, and a first flow index;
   (b1) raising or lowering the first reactor bed temperature in the gas-phase polymerization reactor to a second reactor bed temperature, which is from 1° to 10° C. higher or lower than the first reactor bed temperature; and
   (c) decreasing or increasing, respectively, the H2/C2 gas molar ratio in such a way that the comonomer/ethylene gas molar ratio is unchanged,
   wherein steps (a) to (c) are done without changing the alpha-olefin of the comonmer feed; thereby making at steady-state conditions after step (c) a second ethylene/alpha-olefin copolymer at the second reactor bed temperature that is different than the first reactor bed temperature,
   wherein the second ethylene/alpha-olefin copolymer has the same alpha-olefin and has a second melt storage modulus G' (G"=3,000 Pa) and second density value, wherein the second melt storage modulus G' (G"=3,000 Pa) is substantially the same as the first melt storage modulus G' (G"=3,000 Pa) and the second density value is substantially the same as the first density value.

6. The method of claim 5 having any one of limitations (i) to (v):

(i) wherein in step (b1) the first reactor bed temperature is increased to the second reactor bed temperature and wherein the second reactor bed temperature is from 1° to 5° C. higher than the first reactor bed temperature; and wherein in step (c) the first H2/C2 gas molar ratio of the hydrogen and ethylene feeds is decreased to a second H2/C2 gas molar ratio and wherein the second H2/C2 gas molar ratio is from 0.01 to 0.20 lower than the first H2/C2 gas molar ratio;

(ii) wherein a melt storage modulus G' (G"=3,000 Pa) for the second ethylene/alpha-olefin copolymer is from 500 to 5,000 Pascals (Pa);

(iii) both (i) and (ii);

(iv) wherein in step (b1) the first reactor bed temperature is decreased to the second reactor bed temperature and wherein the second reactor bed temperature is from 1° to 5° C. lower than the first reactor bed temperature; and wherein in step (c) the H2/C2 gas molar ratio of the hydrogen and ethylene feeds is increased from the first H2/C2 gas molar ratio to a second H2/C2 gas molar ratio and wherein the second H2/C2 gas molar ratio is from 0.01 to 0.20 higher than the first H2/C2 gas molar ratio; and (v) both (ii) and (iv).

7. The method of claim 1 wherein the Composition Distribution Breadth Index value and density of the second ethylene/alpha-olefin copolymer are substantially unchanged from the Composition Distribution Breadth Index value and density, respectively, of the first ethylene/alpha-olefin copolymer.

* * * * *